(12) United States Patent
Hsu

(10) Patent No.: US 9,661,461 B1
(45) Date of Patent: May 23, 2017

(54) METHOD FOR SEARCHING ELECTRONIC DEVICE AND ELECTRONIC DEVICE

(71) Applicant: Acer Incorporated, New Taipei (TW)

(72) Inventor: Jung-Chu Hsu, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 15/002,411

(22) Filed: Jan. 21, 2016

(30) Foreign Application Priority Data

Nov. 3, 2015 (TW) .............................. 104136122 A

(51) Int. Cl.
*H04W 24/00* (2009.01)
*H04W 4/02* (2009.01)
*H04W 64/00* (2009.01)
*H04W 24/08* (2009.01)
*H04W 4/00* (2009.01)

(52) U.S. Cl.
CPC ............ *H04W 4/02* (2013.01); *H04W 4/008* (2013.01); *H04W 24/08* (2013.01); *H04W 64/00* (2013.01)

(58) Field of Classification Search
None
See application file for complete search history.

(56) References Cited

U.S. PATENT DOCUMENTS

2015/0181548 A1* 6/2015 Varoglu ................ H04W 64/00
455/456.2

FOREIGN PATENT DOCUMENTS

| TW | 201238377 | 9/2012 |
|----|-----------|--------|
| TW | 201411567 | 3/2014 |
| TW | 201507434 | 2/2015 |
| TW | 201527783 | 7/2015 |

* cited by examiner

*Primary Examiner* — Erika Washington
(74) *Attorney, Agent, or Firm* — Jianq Chyun IP Office

(57) ABSTRACT

A method for searching an electronic device and an electronic device are provided. The method includes following steps. A request packet that is broadcasted by another electronic device according to a wireless communication protocol is received. It is determined whether the electronic device matches a target device indicated by the request packet according to target identification information in the request packet. If the electronic device does not match the target device indicated by the request packet, another request packet is generated and broadcasted according to the wireless communication protocol. If the electronic device matches the target device, indication for indicating location information of the electronic device is supplied.

8 Claims, 4 Drawing Sheets

METHOD FOR SEARCHING ELECTRONIC DEVICE AND ELECTRONIC DEVICE

CROSS-REFERENCE TO RELATED APPLICATION

This application claims the priority benefit of Taiwan application serial no. 104136122, filed on Nov. 3, 2015. The entirety of the above-mentioned patent application is hereby incorporated by reference herein and made a part of this specification.

FIELD OF INVENTION

The invention relates to a wireless communication device, and in particular, to a method for searching an electronic device and an electronic device.

DESCRIPTION OF RELATED ART

With the progress of information and communication technologies, the development of various electronic devices, and the advancement of the functions performed by these electronic devices, the electronic devices become more and more indispensable for human beings. That is, each individual is likely to own one or more electronic devices in the modern society. Nevertheless, the electronic devices with portability may be placed everywhere carelessly, and users of the electronic devices may no longer be able to find the portable electronic devices. If the electronic devices cannot be found immediately or as soon as possible, the electronic devices may even be lost or stolen.

In most cases, if a user misplaces his or her mobile phone, the user often calls the phone number, so that the misplaced phone may ring or vibrate through mobile network. Thereby, the user may learn the location of his or her mobile phone through the sound or vibration of the phone. However, if the mobile phone is left in a place where no mobile network is available (e.g., in the basement), the user is unable to find the location of the mobile phone through calling the phone number. From another perspective, conventional Bluetooth electronic devices may be found through Bluetooth wireless transmission; in such a scenario; however, the to-be-found target device can only respond when the target device is located within the range where the Bluetooth signals can be received. If the target device is too far from the user, the target device cannot respond to the Bluetooth signals because the target device is not within the Bluetooth reception range; hence, the user is not able to learn the location of the target device at once. As a result, the user must spend more time on moving to multiple locations for the target device to possibly pick up the Bluetooth signals and respond.

SUMMARY

In view of the above, a method for searching an electronic device and an electronic device are provided, whereby the time spent on searching a certain electronic device can be reduced because the search range may be expanded through collaborative searches conducted by multiple electronic devices.

In an embodiment of the invention, a method for searching an electronic device is adapted to an electronic device supporting a wireless communication protocol. The method includes following steps. A request packet that is broadcasted by another electronic device according to a wireless communication protocol is received. It is determined whether the electronic device matches a target device indicated by the request packet according to target identification information in the request packet. If the electronic device does not match the target device indicated by the request packet, another request packet is generated according to the request packet, and the another request packet is broadcasted according to the wireless communication protocol If the electronic device matches the target device, indication for indicating location information of the electronic device is supplied.

In another embodiment of the invention, an electronic device that includes a wireless communication module supporting a wireless communication protocol, a storage unit, and at least one processor is provided. The storage unit records a plurality of modules. The at least one processor is coupled to the wireless communication module and the storage unit to access and execute the modules recorded in the storage unit. The modules include a reception module, a determination module, a request transferring module, and a prompting module. The reception module receives a request packet through the wireless communication module, and the request packet is broadcasted by another electronic device according to a wireless communication protocol. The determination module determines whether the electronic device matches a target device indicated by the request packet according to target identification information in the request packet. If the electronic device does not match the target device indicated by the request packet, the request transferring module generates another request packet according to the request packet and broadcasts the another request packet according to the wireless communication protocol. If the electronic device matches the target device indicated by the request packet, the prompting module supplies indication for indicating location information of the electronic device.

In view of the method for searching the electronic device and the electronic device provided herein, the request packet is transferred between or among the electronic devices, such that the target device is more likely to receive the request packet, i.e., the success rate of finding the electronic device can be raised. If the electronic device does not match the target device indicated by the request packet, the electronic device generates another request packet according to the request packet, and the another request packet is broadcasted according to the wireless communication protocol. By contrast, if the electronic device matches the target device indicated by the request packet, the electronic device supplies indication for indicating the location information of the electronic device.

Several exemplary embodiments accompanied with figures are described in detail below to further describe the disclosure in details.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DETAILED DESCRIPTION OF DISCLOSED EMBODIMENTS

Figure 1:
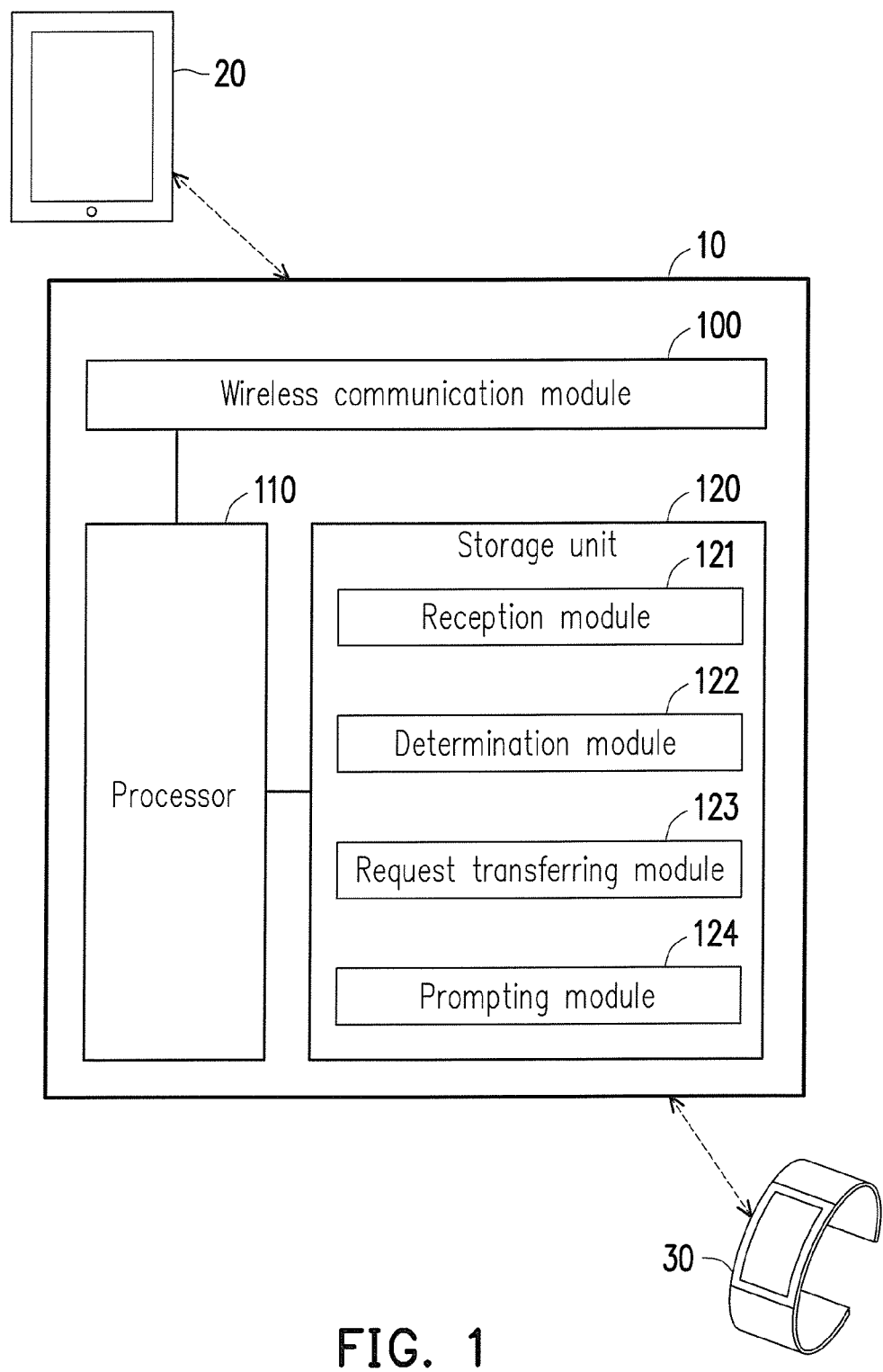
FIG. 1 is a schematic view illustrating an electronic device according to an embodiment of the invention.

Descriptions of the invention are given with reference to the exemplary embodiments illustrated with accompanied drawings, wherein same or similar parts are denoted with same reference numerals. In addition, whenever possible, identical or similar reference numbers stand for identical or similar elements in the figures and the embodiments.

FIG. 1 is a schematic view illustrating an electronic device according to an embodiment of the invention. With reference to FIG. 1, the electronic device 10 may be a wireless earphone, a wireless mouse, a smart bracelet, a smart watch, a smart phone, a tablet PC, a game console, a notebook computer, a desktop computer, or any electronic device supporting a wireless communication protocol, and the invention is not limited thereto. In an embodiment of the invention, the electronic device 10 can support the Bluetooth (BT) protocol or any other wireless communication protocol that requires the establishment of a broadcasting mechanism prior to actual connection, and the invention is not limited thereto.

For instance, the electronic device 10 may communicate with electronic devices 20 and 30 according to the BT protocol or transmit signals between the electronic devices 20 and 30. For instance, each of the electronic devices 20 and 30 may also be a wireless earphone, a wireless mouse, a smart bracelet, a smart watch, a smart phone, a tablet PC, a game console, a notebook computer, a desktop computer, or any electronic device supporting the same wireless communication protocol as the wireless communication protocol that can be supported by the electronic device 10, and the invention is not limited thereto.

The electronic device 10 includes a wireless communication module 100, at least one processor (e.g., the processor 110), and a storage unit 120. The wireless communication module 100 includes an antenna (not shown) for receiving and emitting radio frequency (RF) signals. Namely, the wireless communication module 100 may be an electronic element supporting BT wireless communication technique of a wireless personal area network (WPAN), or may be an electronic element supporting wireless fidelity (Wi-Fi) wireless communication technique of a wireless local area network (WLAN), and the invention is not limited thereto. In particular, the wireless communication module 100 may include one or more devices that can support different types of wireless communication protocols. Besides, in an embodiment of the invention, the wireless communication module 100 can support any other wireless communication protocol that requires a host to establish a broadcasting mechanism prior to actual connection, and the invention is not limited thereto.

The processor 110 is coupled to the wireless communication module 100 and the storage unit 120. Here, the processor 110 is, for instance, a central processing unit (CPU), a programmable microprocessor, a programmable digital signal processor (DSP), a programmable controller, an application specific integrated circuit (ASIC), a programmable logic device (PLD), or any other hardware capable of computation.

The storage unit 120 may be any immobile or mobile random access memory (RAM), read-only memory (ROM), flash memory, hard drive, any other similar device, or a combination thereof for recording a plurality of modules or apps that may be executed by the processor 110.

The electronic device 10 may further include a power supply (not shown), an audio output device (not shown), a display (not shown), and other devices. For instance, the power supply may include a battery. The audio output device serves to output audio signals. For instance, the audio output device may include an amplifier. The display serves to display images and frames. For instance, the display may include a liquid crystal display (LCD) screen installed on the electronic device 10.

In the present embodiment, the modules in the storage unit 120 at least include a reception module 121, a determination module 122, a request transferring module 123, and a prompting module 124. These modules are, for instance, computer programs that can be loaded into the processor 110, such that the electronic device 10 is able to perform corresponding actions according to the wireless signals received and sent by the wireless communication module 100.

With reference to FIG. 1, given that a user forgets where he or she puts the electronic device 30, the user may issue an order to the electronic device 20 at hand, and the electronic device 20 may broadcast a request packet for searching the electronic device 30 according to a wireless communication protocol. The electronic device 30 may be far from the electronic device 20 or may be blocked by barriers and thus cannot receive the request packet sent by the electronic device 20; however, the electronic device 10 provided in the present embodiment is able to receive the request packet sent by the electronic device 20, generate another request packet according to the received request packet, and broadcast the generated request packet. As long as the electronic device 30 receives the request packet sent by the electronic device 10, the electronic device 30 can properly react to notify the user of the location of the electronic device 30.

Alternatively, given that the user forgets where he or she puts the electronic device 10, the user may issue an order to the electronic device 20 or 30 at hand, and the electronic device 20 or 30 may broadcast a request packet for searching the electronic device 10 according to a wireless communication protocol. As long as the electronic device 10 receives the request packet sent by the electronic device 20 or 30, the electronic device 10 can properly react to notify the user of the location of the electronic device 10. That is, in the present embodiment, the electronic device 10 may be an intermediate that can transfer a search request or a to-be-searched target device. When the electronic device 10 receives the request packet, the electronic device 10 firstly determines whether the electronic device 10 itself is the target device indicated by the request packet according to target identification information recorded in the request packet. If the electronic device 10 determines that it is not the target device indicated by the request packet, the electronic device 10 may perform no action or may transfer the request packet.

Figure 2:
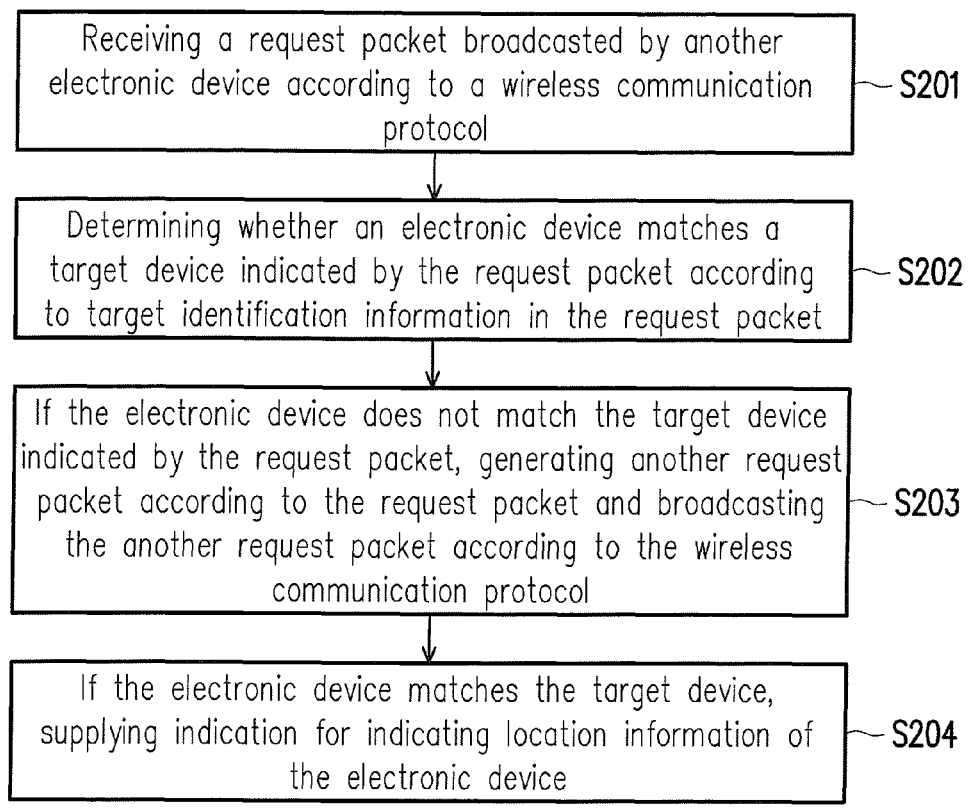
FIG. 2 is a flowchart of a method for searching an electronic device according to an embodiment of the invention.

Another embodiment is exemplified hereinafter to elaborate how the electronic device 10 executes the detailed steps of a method for searching an electronic device. FIG. 2 is a flowchart of a method for searching an electronic device according to an embodiment of the invention. The method provided in the present exemplary embodiment is adapted to the electronic device 10 shown in FIG. 1, and the detailed steps in the method are explained hereinafter with reference to the components in the electronic device 10.

Given that the electronic device 20 responds to the user's control and sends a request packet having the target identification information, in step S201, the reception module 121 receives the request packet through the wireless communication module 100, and the request packet is broadcasted by the electronic device 20 according to the wireless communication protocol. In step S202, the determination module 122 determines whether the electronic device 10 matches a target device indicated by the request packet according to target identification information in the request packet. Particularly, the target identification information is a device identification code, a communication address, or any other identification information that can represent the device, which should however not be construed as a limitation to the invention. Through comparing the target identification information with the device information of the electronic device 10, the determination module 122 determines whether the electronic device 10 is the target device searched by the electronic device 20.

In step S203, if the electronic device 10 does not match the target device indicated by the request packet, the request transferring module 123 generates another request packet according to the request packet and broadcasts the another request packet according to the wireless communication protocol. To be specific, the request transferring module 123 modifies a source address of a packet header of the request packet and accordingly generates another request packet, and the request transferring module 123 broadcasts the newly generated request packet. The request transferring module 123 may modify or may not modify the payload of the request packet; however, the request packet received by the electronic device 10 and another request packet generated by the electronic device 10 record the same target identification information. In step S204, by contrast, if the electronic device 10 matches the target device indicated by the request packet, the prompting module 124 supplies indication for indicating location information of the electronic device 10. For instance, the prompting module 124 may generate a reply packet or may directly issue sound or vibration, so as to notify the user of the location of the electronic device 10.

It should be mentioned that when the electronic device 10 prompts the location information through sending back the reply packet in an embodiment of the invention, the electronic device 10 may determine the search fails if the electronic device 20 does not receive any reply packet recording the location information of the target device within a predetermined period of time.

In an embodiment of the invention, if the electronic device 20 acting as a searching party generates the request packet, the device information or the address (e.g., a media access control address; namely, the MAC address) of the electronic device 20 may be recorded into the payload of the request packet. Thereby, other electronic devices acting as intermediates may determine where the reply packet should be sent according to the device information or the address of the electronic device 20 recorded into the payload.

Note that the invention is not limited to the previous embodiments; based on actual requirements, changes may be made to the previous embodiments. For instance, to prevent the request packet from being transferred repeatedly, a count value may be embedded in the request packet according to another embodiment of the invention; every time when the request packet is transferred by the intermediate, the count value may be increased or decreased. Thereby, the electronic device may determine whether to further broadcast the request packet or not according to the count value in the request packet. Another embodiment is provided hereinafter for further explanation.

Figure 3:
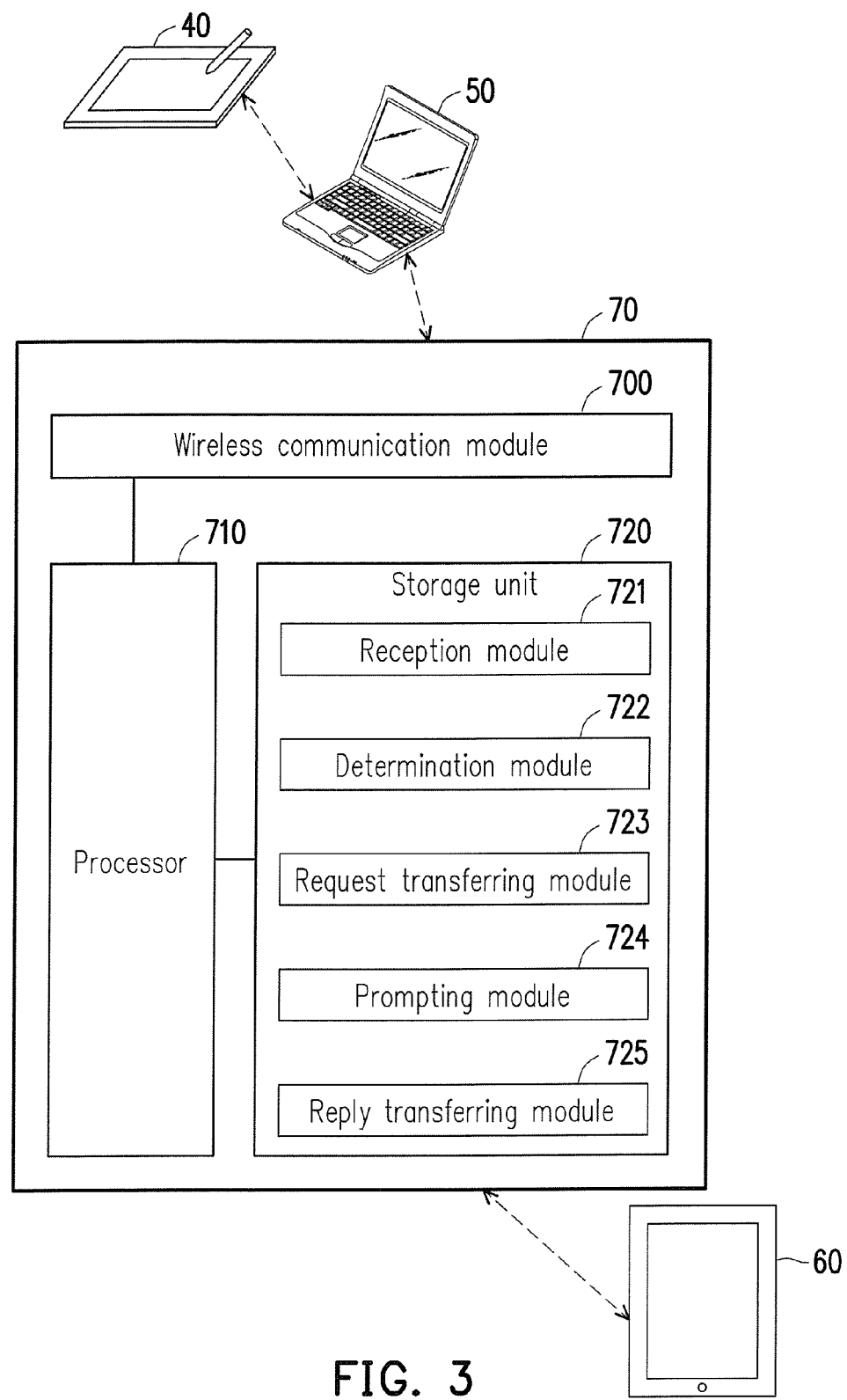
FIG. 3 is a schematic view illustrating an electronic device according to an embodiment of the invention.

FIG. 3 is a schematic view illustrating an electronic device according to an embodiment of the invention. With reference to FIG. 3, each of the electronic devices 40, 50, 60, and 70 may be a wireless earphone, a wireless mouse, a smart bracelet, a smart watch, a smart phone, a tablet PC, a game console, a notebook computer, a desktop computer, or any electronic device supporting a wireless communication protocol, and the invention is not limited thereto. In an embodiment of the invention, the electronic device 40, 50, 60, or 70 can support the BT protocol or any other wireless communication protocol that requires the establishment of a broadcasting mechanism prior to actual connection, and the invention is not limited thereto.

The electronic device 70 includes a wireless communication module 700, at least one processor (e.g., the processor 710), and a storage unit 720. The storage unit 720 records a reception module 721, a determination module 722, a request transferring module 723, a prompting module 724, and a reply transferring module 725. The wireless communication module 700, the processor 710, and the storage unit 720 are the same as or similar to the wireless communication module 100, the processor 110, and the storage unit 120 depicted in FIG. 1, and therefore no further description will be provided hereinafter. The difference therebetween lies in that the storage unit 720 further records the reply transferring module 725 for receiving and transferring a reply packet. The reply packet is generated by the target device in response to the reception of the request packet, and the reply packet records location information of the target device.

Figure 4:
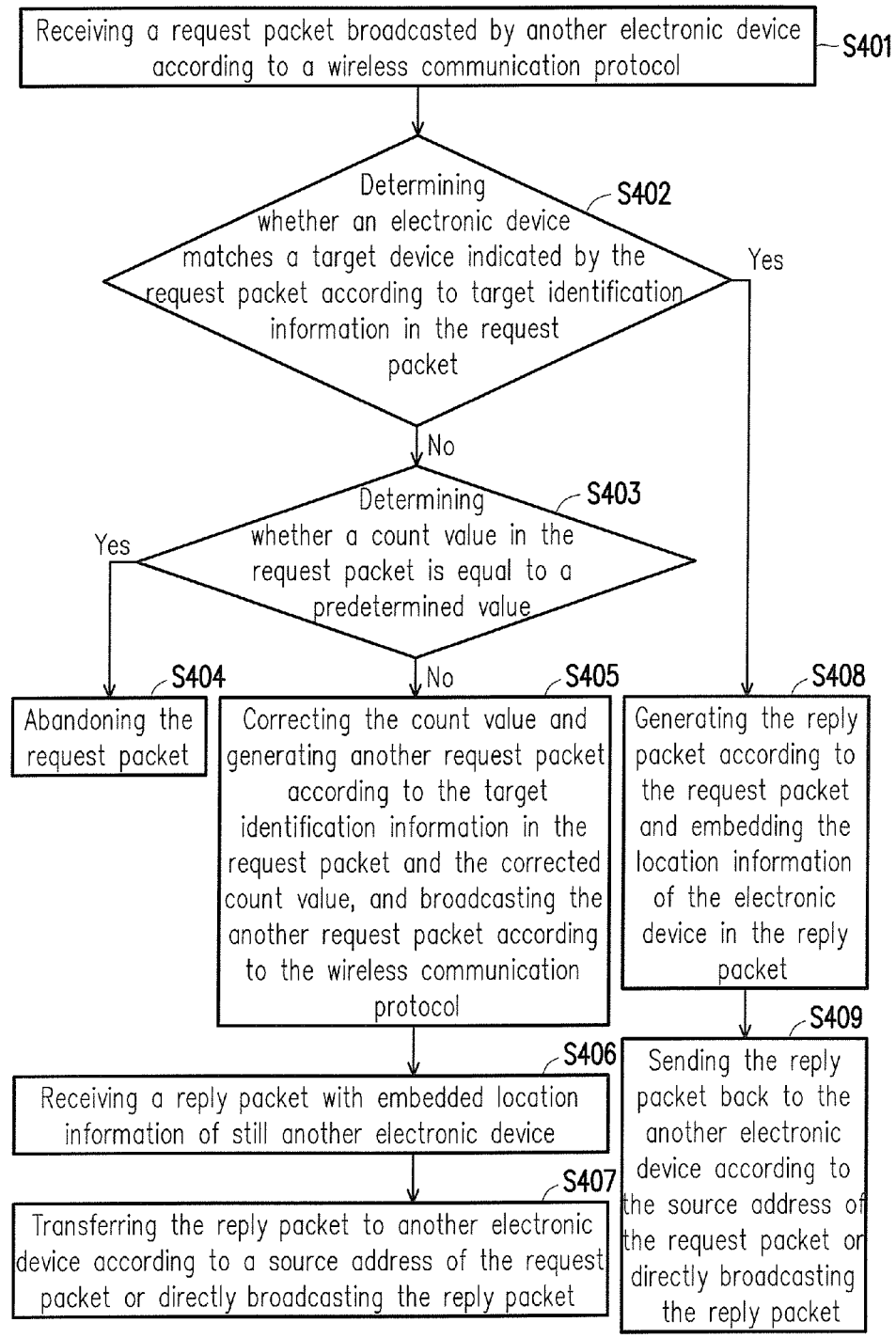
FIG. 4 is a flowchart of a method for searching an electronic device according to an embodiment of the invention.

Another embodiment is exemplified hereinafter to elaborate how the electronic device 70 executes the detailed steps of a method for searching an electronic device. FIG. 4 is a flowchart of a method for searching an electronic device according to an embodiment of the invention. The method provided in the present exemplary embodiment is adapted to the electronic device 70 shown in FIG. 3, and the detailed steps in the method are explained hereinafter with reference to the components in the electronic device 70.

If the user issues an order to the electronic device 40 at hand to search the target device, it should be mentioned that the electronic device 40 provided in the present embodiment accordingly generates and broadcasts the request packet for searching the target device. In the present embodiment, a count value is embedded in the request packet, and the electronic device 40 may set the count value as a predetermined value (including but not limited to "0", "5", "3", "2", and so on) while generating the request packet, and the predetermined value is not limited to those provided herein. The electronic device 50 may receive the request packet sent by the electronic device 40; after modifying the request packet, the electronic device 50 then broadcasts the modified request packet. Particularly, the electronic device 50 modifies the source address of the request packet to the communication address of the electronic device 50 and modifies the count value in the request packet, so as to generate the modified request packet. The electronic device 50 broadcasts the modified request packet, and the electronic device 70 receives the request packet broadcasted by the electronic device 50.

In step S401, the reception module 721 receives the request packet broadcasted by the electronic device 50 according to a wireless communication protocol. In step S402, the determination module 722 determines whether the electronic device 70 matches the target device indicated by the request packet. If yes, the electronic device 70 is deemed as the target device to be searched by the electronic device 40; in step S408, the prompting module 724 generates a reply packet according to the request packet and embeds the location information of the electronic device 70 in the reply packet. In step S409, the prompting module 724 sends the reply packet back to the electronic device 50 according to the source address of the request packet or directly broadcasts the reply packet.

In an embodiment of the invention, the prompting module 724 may directly embed the location information generated by a global positioning system (GPS) in the reply packet or embed the location information generated by other positioning devices in the reply packet. Thereby, as long as the electronic device 40 receives the reply packet, the user is able to directly learn the location of the electronic device 70 according to the content of the reply packet, which should however not be construed as a limitation to the invention.

In an embodiment of the invention, the prompting module 724 may measure a signal intensity parameter associated with the request packet. The prompting module 724 then embeds the signal intensity parameter in the reply packet; here, the signal intensity parameter acts as the location information of the electronic device 70. It should be mentioned that the prompting module 724 can directly embed the measured signal intensity parameter in the reply packet, such that the electronic device 40 is able to estimate the distance from the electronic device 70 to the electronic device 50 according to the signal intensity in the reply packet and thereby limit the required search scope. Alternatively, the prompting module 724 may estimate the distance from the electronic device 70 to the electronic device 50 according to the signal intensity associated with the request packet and directly record the distance into the reply packet.

With reference to FIG. 4, if the determination module 722 determines the electronic device 70 does not match the target device indicated by the request packet in step S402, the electronic device 70 is not deemed as the target device to be searched by the electronic device 40 but can serve as the intermediate for searching the target device. In step S403, the request transferring module 723 determines whether the count value in the request packet is equal to the predetermined value. The predetermined value is an integer, such as "0", "5", "3", "2", and so on, and the invention is not limited thereto. If the request transferring module 723 determines the count value in the request packet is equal to the predetermined value in step S403, the request transferring module 723 abandons the request packet in step S404. If the request transferring module 723 determines the count value in the request packet is not equal to the predetermined value in step S403, the request packet has not been transferred for a certain number of times. In step S405, the request transferring module 723 modifies the count value and generates another request packet according to the target identification information in the request packet and the modified count value, and the request transferring module 723 broadcasts the another request packet according to the wireless communication protocol. Specifically, the request transferring module 723 may modify the count value by adding one to or subtracting one from the count value, for instance. That is, every time when the request packet recording the same target identification information is transferred, the count value in the request packet may be increased or decreased accordingly.

In the present embodiment, if the electronic device 60 acting as the target device is able to receive the request packet sent by the electronic device 70, the electronic device 60 generates the reply packet recording the location information of the electronic device 70 and sends the reply packet to the electronic device 703. In step S406, the reply transferring module 72 receives the reply packet with the embedded location information of the electronic device 60. In step S407, the reply transferring module 725 transfers the reply packet to the electronic device 50 according to the source address of the request packet or directly broadcasts the reply packet. Similarly, the electronic device 50 sends the reply packet containing the location information of the electronic device 60 back to the electronic device 40, such that the electronic device 40 acting as the searching party is able to learn the location of the target device.

To sum up, according to an embodiment of the invention, if the electronic device does not match the target device indicated by the request packet, the electronic device generates another request packet according to the request packet, and the another request packet is broadcasted according to the wireless communication protocol. By contrast, if the electronic device matches the target device indicated by the request packet, the electronic device prompts the location information of the electronic device. Through transferring the request packet among the electronic devices, the search range within which the target device is searched according to the wireless communication protocol can be expanded, such that the target device is much more likely to receive the request packet, and the success rate of finding the electronic device can be raised. Moreover, it is not necessary for the user to move to different locations and control the electronic device at hand to send the search signals; as such, the time spent on searching the target device can be significantly reduced, and such mechanism definitely brings convenience to the user.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A method for searching an electronic device, the method being adapted to an electronic device supporting a wireless communication protocol and comprising:
   receiving a request packet;
   determining whether the electronic device matches a target device indicated by the request packet according to target identification information in the request packet;
   if the electronic device does not match the target device indicated by the request packet, generating another request packet according to the request packet and broadcasting the another request packet according to the wireless communication protocol; and
   if the electronic device matches the target device, supplying indication for indicating location information of the electronic device,
   wherein the step of generating the another request packet according to the request packet and broadcasting the another request packet according to the wireless communication protocol comprises:
   determining whether a count value in the request packet is equal to a predetermined value; and if not, modifying the count value, generating the another request packet according to the target identification information in the request packet and the modified count value, and broadcasting the another request packet according to the wireless communication protocol.

2. The method of claim 1, wherein the step of supplying the indication for the indicating location information of the electronic device comprises:
generating a reply packet according to the request packet and embedding the location information of the electronic device in the reply packet; and
sending the reply packet back to another electronic device according to a source address of the request packet or directly broadcasting the reply packet.

3. The method of claim 2, wherein the step of generating the reply packet according to the request packet and embedding the location information of the electronic device in the reply packet comprises:
measuring a signal intensity parameter associated with the request packet; and
embedding the signal intensity parameter in the reply packet, the signal intensity parameter acting as the location information of the electronic device.

4. The method of claim 1, after generating the another request packet according to the request packet and broadcasting the another request packet according to the wireless communication protocol, further comprising:
receiving a reply packet with embedded location information of still another electronic device; and
transferring the reply packet to another electronic device according to a source address of the request packet or directly broadcasting the reply packet.

5. An electronic device comprising:
a wireless communication module supporting a wireless communication protocol;
a storage unit recording a plurality of modules; and
at least one processor coupled to the wireless communication module and the storage unit to access and execute the modules recorded in the storage unit, the modules comprising:
a reception module receiving a request packet through the wireless communication module;
a determination module determining whether the electronic device matches a target device indicated by the request packet according to target identification information in the request packet;
a request transferring module, wherein if the electronic device does not match the target device indicated by the request packet, the request transferring module generates another request packet according to the request packet and broadcasts the another request packet according to the wireless communication protocol; and
a prompting module prompting location information of the electronic device if the electronic device matches the target device indicated by the request packet,
wherein the request transferring module determines whether a count value in the request packet is equal to a predetermined value, and if the count value in the request packet is not equal to the predetermined value, the request transferring module modifies the count value and generates another request packet according to the target identification information in the request packet and the modified count value.

6. The electronic device of claim 5, wherein the prompting module generates a reply packet according to the request packet and embeds the location information of the electronic device in the reply packet, and the prompting module sends the reply packet to another electronic device according to a source address of the request packet or directly broadcasts the reply packet.

7. The electronic device of claim 6, wherein the prompting module measures a signal intensity parameter associated with the request packet and embeds the signal intensity parameter in the reply packet, and the signal intensity parameter acts as the location information of the electronic device.

8. The electronic device of claim 5, the modules further comprising:
a reply transferring module receiving a reply packet with embedded location information of still another electronic device and transferring the reply packet to another electronic device according to a source address of the request packet or directly broadcasting the reply packet.

* * * * *